United States Patent
Doushita et al.

(10) Patent No.: US 9,172,229 B2
(45) Date of Patent: Oct. 27, 2015

(54) WIRE HARNESS SECURING STRUCTURE

(71) Applicant: Yazaki Corporation, Tokyo (JP)

(72) Inventors: Kenichi Doushita, Kosai (JP);
Mitsunori Tsunoda, Toyota (JP);
Kouhei Niiho, Makinohara (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 14/531,284

(22) Filed: Nov. 3, 2014

(65) Prior Publication Data
US 2015/0047895 A1 Feb. 19, 2015

Related U.S. Application Data

(63) Continuation of application No. PCT/JP2013/002918, filed on May 2, 2013.

(30) Foreign Application Priority Data

May 8, 2012 (JP) .................. 2012-106541
May 8, 2012 (JP) .................. 2012-106543

(51) Int. Cl.
*H02G 3/30* (2006.01)
*B60R 16/02* (2006.01)

(52) U.S. Cl.
CPC .............. *H02G 3/24* (2013.01); *B60R 16/0215* (2013.01)

(58) Field of Classification Search
CPC .............. H02G 3/22; H02G 3/24; H02G 3/30; H02G 3/305; H02G 3/32; H02G 3/36; H02G 3/386; H02G 3/388; B60R 16/02; B60R 16/0207; B60R 16/0215; F16B 19/00; F16B 19/002; F16B 19/004

USPC .............. 174/480, 483, 650, 135, 72 A, 70 R, 174/40 CC, 68.1; 248/49, 74.1, 74.2, 74.3, 248/73, 71
See application file for complete search history.

(56) References Cited

U.S. PATENT DOCUMENTS

| | | | | |
|---|---|---|---|---|
| 3,210,032 A * | 10/1965 | Van Slyke | ................... | 174/72 A |
| 4,811,922 A * | 3/1989 | Yoneyama | ................... | 174/72 A |
| 4,918,261 A * | 4/1990 | Takahashi et al. | ............ | 174/135 |
| 6,311,934 B1 * | 11/2001 | Fujii et al. | ........................ | 248/73 |
| 7,045,715 B2 * | 5/2006 | Ono | ............................ | 174/72 A |
| 8,507,794 B2 * | 8/2013 | Wada | ........................... | 174/72 A |
| 2001/0023778 A1 | 9/2001 | Kondoh | | |
| 2014/0151116 A1 * | 6/2014 | Doshita | ...................... | 174/70 R |

FOREIGN PATENT DOCUMENTS

| | | |
|---|---|---|
| JP | 10-014062 A | 1/1998 |
| JP | 2007-259604 A | 10/2007 |

OTHER PUBLICATIONS

International Search Report and Written Opinion dated Jan. 24, 2014, issued for PCT/JP2013/002918.

* cited by examiner

*Primary Examiner* — Angel R Estrada
(74) *Attorney, Agent, or Firm* — Locke Lord LLP

(57) ABSTRACT

A wire harness securing structure secures a wire harness to a panel using a wire harness clip having a plate portion and a latch portion provided at the plate portion to be press-fitted to a hole of the panel. The latch portion includes a post extending from the plate portion and a pair of latch pieces extending from an end of the post toward the plate portion and having an end which engages with an edge of the hole. The plate portion and the wire harness are covered and secured by the self-adhesive sheet. A surface of the self-adhesive sheet facing the panel contacts with the end of the latch piece before the latch portion is press-fitted. When the latch portion is press-fitted and latched to the hole, the adhesive sheet between the plate portion and the panel is compressed and contacts firmly with an outer periphery of the hole.

12 Claims, 15 Drawing Sheets

WIRE HARNESS SECURING STRUCTURE

CROSS REFERENCE TO RELATED APPLICATIONS

This application is related to co-pending application: "WIRE HARNESS FIXING STRUCTURE" filed even date herewith in the names of Kenichi Doushita, Mitsunori Tsunoda and Kouhei Niiho as a national phase entry of PCT/JP2013/002931, which application is assigned to the assignee of the present application and is incorporated by reference herein.

TECHNICAL FIELD

The present invention relates to a wire harness securing structure for securing a wire harness to a panel using a wire harness clip.

BACKGROUND ART

FIGS. 24A to 24C illustrate a wire harness securing structure for securing a wire harness to a secured member using a conventional wire harness clip.

The wire harness securing structure shown in FIGS. 24A to 24C is arranged to secure a wire harness 202 to a secured member 201 such as a body, various devices and a panel of a vehicle and is provided with a wire harness clip 203 arranged to be latched to a latch hole 201a of the secured member 201 and a securing film 204 retaining the wire harness clip 203.

The wire harness clip 203 is made of synthetic resin or the like and is provided with an anchor portion 203a to be latched to the latch hole 201a of the secured member 201 and a plate portion 203b formed into a rectangular-plate shape.

A first latch piece 203c and a second latch piece 203d are provided at a distal end of the anchor portion 203a. When the anchor portion 203a is inserted into the latch hole 201a of the secured member 201, the first latch piece 203c and the second latch piece 203d are elastically deformed and compressed, and when the anchor portion 203a has passed through the latch hole 201a, the first latch piece 203c and the second latch piece 203d are restored and latched to the latch hole 201a.

The securing film 204 is a heat-shrinkable film made of polyolefin resin or vinyl chloride resin or the like and is provided with a through hole 204a through which the anchor portion 203a is passed.

When securing the wire harness 202 to the secured member 201 using the above-described wire harness clip 203 and the securing film 204, firstly, the anchor portion 203a of the wire harness clip 203 is inserted into the through hole 204a of the securing film 204, as shown in FIG. 24A, so that the wire harness clip 203 is retained to the securing film 204 with the plate portion 203b being abutted on the securing film 204.

Next, as shown in FIG. 24B, the wire harness 202 is placed on a middle portion of the securing film 204, and the securing film 204 is folded forward to wrap the wire harness 202. Then, the overlapped portion of the securing film 204 is bonded, welded or subjected to thermal compression bonding, followed by heating and shrinking the securing film 204, thereby securing the wire harness clip 203 and the wire harness 202 to each other.

Then, as shown in FIG. 24C, the anchor portion 203a of the wire harness clip 203 is latched to the latch hole 201a of the secured member 201, thereby securing the wire harness 202 to the secured member 201 (refer to Patent Literature 1).

FIG. 25 is a perspective view showing another conventional wire harness clip. FIG. 26 is a cross sectional view taken along a line D-D in FIG. 25. FIG. 27 is a cross sectional view showing a latch portion of the wire harness clip shown in FIGS. 25, 26 which is press-fitted and latched to a hole of a panel.

A wire harness clip 300 shown in FIGS. 25 to 27 is arranged to secure a wire harness formed by bundling a plurality of electric wires to a panel 3 (refer to FIG. 27). The wire harness clip 300 includes a clip main body 301 made of synthetic resin and a packing 302 attached to the clip main body 301.

The clip main body 301 is formed into an elongated plate shape and is provided with a plate portion 310 to be placed along the wire harness, a latch portion 311 to be press-fitted and latched to a hole 3a of the panel 3 and a vane portion 315 to which the packing 302 is attached.

The latch portion 311 includes a support post 312 extending from a central portion of the plate portion 310 and a pair of latch pieces 313 extending from a distal end of the support post 312 toward the plate portion 310. A step-like latch shoulder portion 314 is formed at a distal end of each latch piece 313. The latch portion 311 is press-fitted to the hole 3a of the panel 3 from the side of the distal end of the support post 312, and the respective latch shoulder portions 314 of the pair of latch pieces 313 are engaged with an edge of the hole 3a, by which the latch portion 311 is latched to the hole 3a.

The vane portion 315 is arranged around a proximal end portion of the support post 312 in a dish-like shape and has elasticity. Also, as shown in FIG. 26, the vane portion 315 is shaped so as to extend toward the panel 3 as it extends from a central portion to an outer edge portion.

The packing 302 is attached on a surface of the vane portion 315 facing the panel 3 and is provided with a hole 320 which is formed at a central portion arranged to pass the latch portion 311 therethrough. When the latch portion 311 is press-fitted and latched to the hole 3a of the panel 3, this packing 302 is in close contact with an outer periphery portion of the hole 3a, thereby preventing water or dust from entering from the hole 3a into an inner side of the panel 3 (i.e. the side of the plate portion 310 in FIG. 27).

When securing the wire harness to the panel 3 using the above-described wire harness clip 300, firstly the plate portion 310 is placed along the wire harness, and then the plate portion 310 and the wire harness are wrapped and secured by a tape. Then, the latch portion 311 is press-fitted and latched to the hole 3a of the panel 3, thereby securing the wire harness to the panel 3.

However, the wire harness securing structure which uses the above-described wire harness clip 203 has a problem as described below. That is, the securing film 204, i.e. the heat-shrinkage film, typically has small elasticity, thus it is difficult to make the securing film 204 in close contact with the outer periphery portion of the latch hole 201a. Thus, this wire harness securing structure cannot be used when sealing performance for the latch hole 201a is required.

Furthermore, the wire harness securing structure which uses the above-described wire harness clip 300 has a problem as described below. That is, in the wire harness clip 300, when the latch portion 311 is press-fitted and latched to the hole 3a of the panel 3, the amount of compression of the packing 302 which is in close contact with the panel 3 decreases toward the central portion of the vane portion 315 from the outer edge portion of the vane portion 315. Thus, the amount of compression of the packing 302 is not uniform, possibly causing water or dust to enter from the hole 3a into the inner side of the panel 3. Moreover, if the packing 302 is attached to the vane portion 315 in a manner such that a center of the packing 302 is displaced with respect to a center of the latch portion 311, then there will be less surface area of the packing 302 which is in close contact with the outer periphery portion of the hole 3a, possibly causing water or dust to enter from the hole 3a into the inner side of the panel 3.

FIG. 28 is a cross sectional view of another wire harness securing structure which uses a conventional wire harness clip. In FIG. 28, a reference sign W indicates a wire harness which is formed by bundling a plurality of electric wires, and a reference sign 400 indicates a wire harness clip, and a reference sign 406 indicates a vehicle body panel.

The wire harness clip 400 includes a first dish-shaped portion 401 formed into a circular dish-shape, a wire harness securing piece 402 extending from the first dish-shaped portion 401 and arranged to be placed along the wire harness W, a latch portion 403 arranged at a central portion of a back face of the first dish-shaped portion 401 and arranged to be press-fitted and latched to a hole 407 of the vehicle panel 406, and a second dish-shaped portion 404 formed into a circular dish-shape around the latch portion 403 at the back face of the first dish-shaped portion 401. The second dish-shaped portion 404 is made of resin which is softer than the first dish-shaped portion 401 and is integrally formed with the first dish-shaped portion 401, the wire harness securing piece 402, and the latch portion 403.

An outer periphery portion of the first dish-shaped portion 401 is curved so as to extend outward at a slant toward the back face to form a first stabilizer 411.

The second dish-shaped portion 404 has a dimension that is smaller than the dimension of the first dish-shaped portion 401, and has a bottom portion which is formed integral with a bottom portion of the first dish-shaped portion 401. Similar to the outer periphery portion of the first dish-shaped portion 401, an outer periphery portion of the second dish-shaped portion 404 is curved so as to extend outward at a slant toward the back face to form a second stabilizer 441. This second stabilizer 441 is positioned at an inner side of the first stabilizer 411.

The latch portion 403 includes a support post 431 projecting from the central portion of the back face of the first dish-shaped portion 401 and a pair of latch pieces 432 extending from a distal end of the support post 431 toward the first dish-shaped portion 401. A step-like latch shoulder portion 421 is formed at a distal end of each latch piece 432.

Next, a method for securing the wire harness W to the vehicle body panel 406 using the above-described wire harness clip 400 is explained. Firstly, the wire harness securing piece 402 is placed along the wire harness W, and then the wire harness securing piece 402 and the wire harness W are wrapped and secured by a tape or the like. Then, the latch portion 403 is press-fitted to the hole 407 of the vehicle body panel 406, and the latch shoulder portion 421 is engaged with the edge of the hole 407. By doing so, the first stabilizer 411 and the second stabilizer 441 are contacted firmly with the outer periphery portion of the hole 407. As a result, the vehicle body panel 406 is elastically sandwiched between the pair of latch pieces 432 and the first stabilizer 411, thereby attaching the wire harness clip 400 to the vehicle body panel 406 and securing the wire harness W to the vehicle body panel 406.

In addition, in the wire harness securing structure which uses the above-described wire harness clip 400, the second stabilizer 441 is in close contact with the outer periphery portion of the hole 407, thereby maintaining good sealing performance for the hole 407 (refer to Patent Literature 2).

However, the above-described wire harness clip 400 has a problem as described below. That is, in the wire harness clip 400, the second dish-shaped portion 404 is made of a soft material which is different from the material of the first dish-shaped portion 401 to improve the sealing performance for the hole 407. Thus, a special facility is needed to manufacture the wire harness clip 400, causing an increase in cost.

CITATION LIST

Patent Literature

[Patent Literature 1]
Japan Patent Application Publication No. H10-14062
[Patent Literature 2]
Japan Patent Application Publication No. 2007-259604

SUMMARY OF INVENTION

Technical Problem

In view of the above-described problem, an object of the present invention is to provide a wire harness securing structure which uses a simple and inexpensive wire harness clip and has a superior sealing performance for a hole of a panel.

Solution to Problem

In order to solve the above-described object, the present invention provides, in a first aspect, a wire harness securing structure for securing a wire harness to a panel, including a wire harness clip for securing the wire harness to the panel and an adhesive sheet, wherein the wire harness clip includes a flat plate-like plate portion and a latch portion provided at the plate portion, the latch portion being arranged to be press-fitted and latched to a hole of the panel, wherein the plate portion and the wire harness are covered and secured by the adhesive sheet, wherein the adhesive sheet has elasticity so that, when applied with pressure the adhesive sheet shrinks in a thickness direction of the adhesive sheet and when the pressure is removed thickness of the adhesive sheet is restored, wherein the adhesive sheet is provided with a through hole through which the latch portion is passed, and when the latch portion is press-fitted and latched to the hole of the panel, the adhesive sheet between the plate portion and the panel is compressed and contacts firmly with an outer periphery portion of the hole.

In said securing structure, the latch portion may be provided at a central portion of the plate portion, and an entire portion of the plate portion and the wire harness may be are covered and secured by the adhesive sheet, and in a state before the latch portion is press-fitted and latched to the hole of the panel, surfaces of both ends of the plate portion facing the panel may be positioned closer to the panel than a surface of a central portion of the plate portion facing the panel, so that the plate portion is elastically deformed when the latch portion is press-fitted and latched to the hole of the panel.

Furthermore, the latch portion may include a support post extending from the plate portion and a latch piece extending from a distal end of the support post toward the plate portion, the latch piece having a distal end arranged to engage with an edge of the hole of the panel.

In a state before the latch portion is press-fitted and latched to the hole of the panel, a surface of the self-adhesive sheet facing the panel and the distal end of the latch piece may be in contact with each other.

The through hole formed at the adhesive sheet may have a dimension that is formed smaller than a dimension of the hole of the panel.

The adhesive sheet may be a self-adhesive sheet.

5

Advantageous Effects of Invention

According to the present invention, the wire harness securing structure having a superior sealing performance for the hole of the panel can be provided by using a simple and inexpensive structure. Furthermore, according to the present invention, since the adhesive sheet is widely in close contact with the outer periphery portion of the hole of the panel, superior sealing performance can be provided even if the center of the through hole of the adhesive sheet is slightly displaced with respect to the center of the latch portion of the wire harness clip.

6

Figure 20:
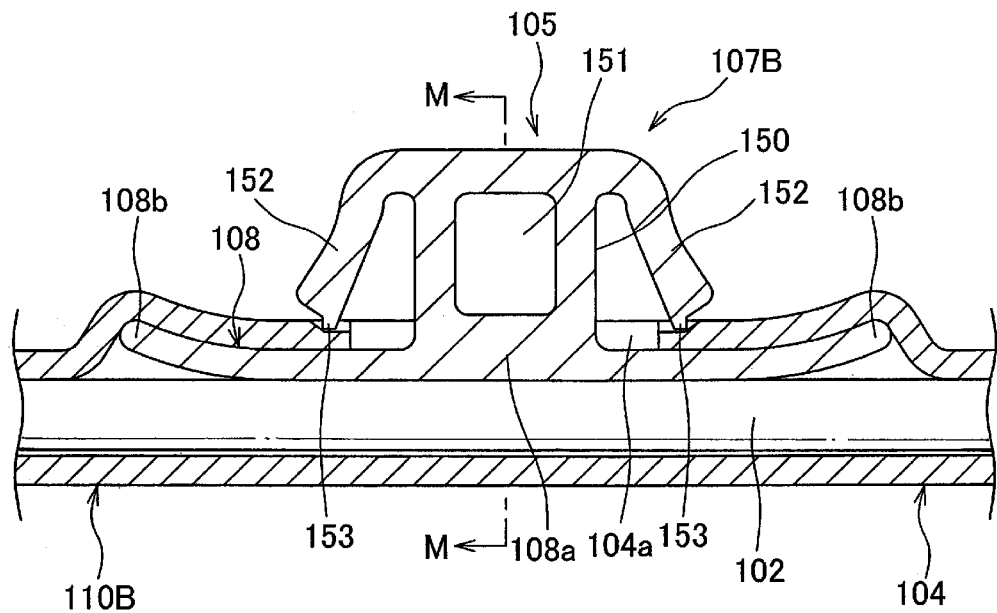
FIG. 20 is a cross-sectional view showing a state in which the wire harness clip shown in FIG. 18 and a wire harness are covered and secured by a self-adhesive sheet.
Figure 21:
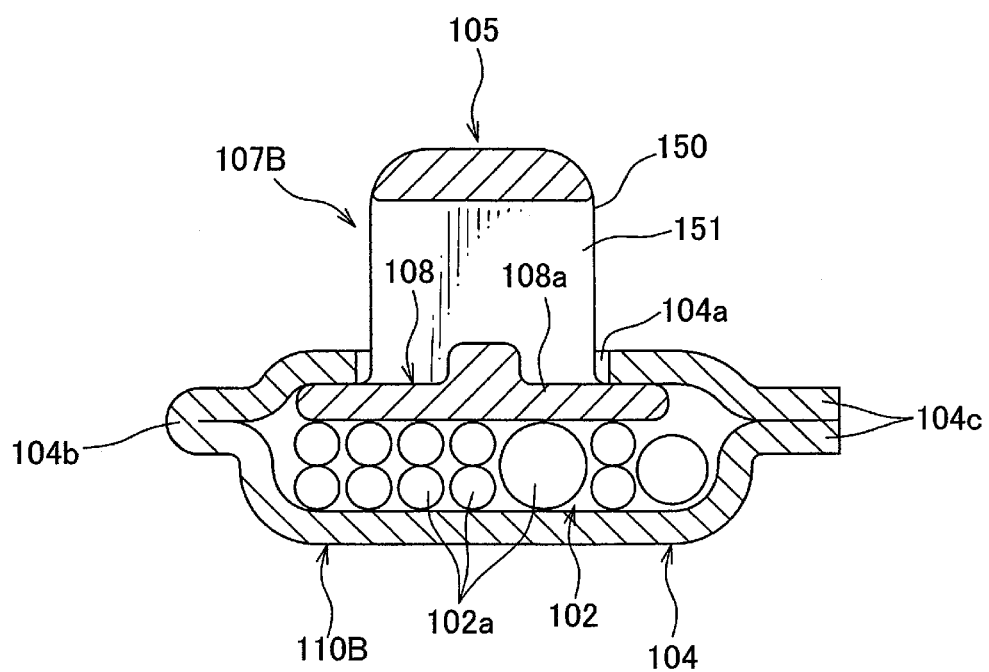

FIG. 21 is a cross-sectional view taken along a line M-M in FIG. 20.

Figure 22:
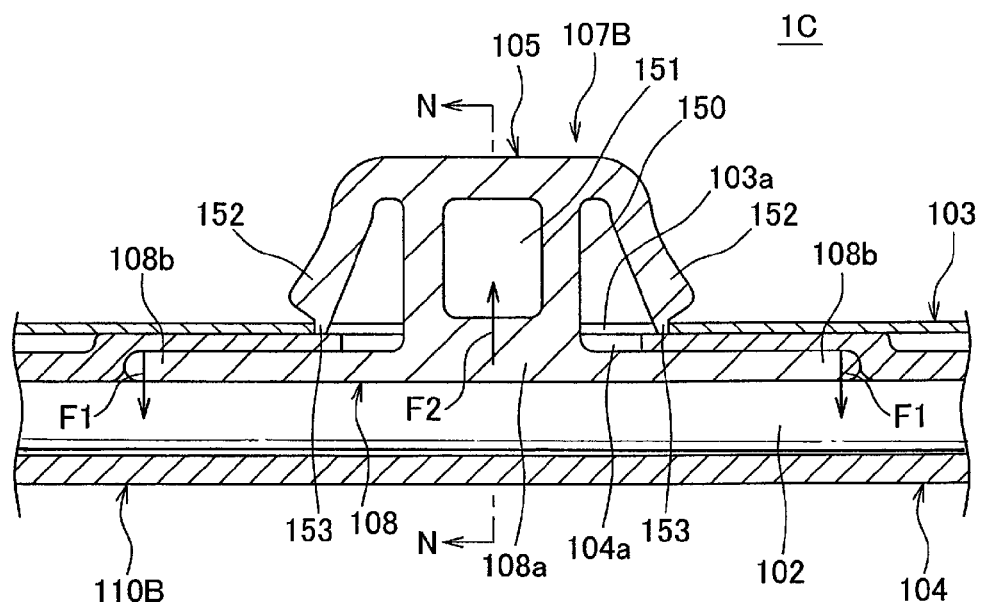

FIG. 22 is a cross-sectional view showing a state in which a latch portion of the wire harness clip shown in FIG. 20 is press-fitted and latched to a hole of a panel.

Figure 23:
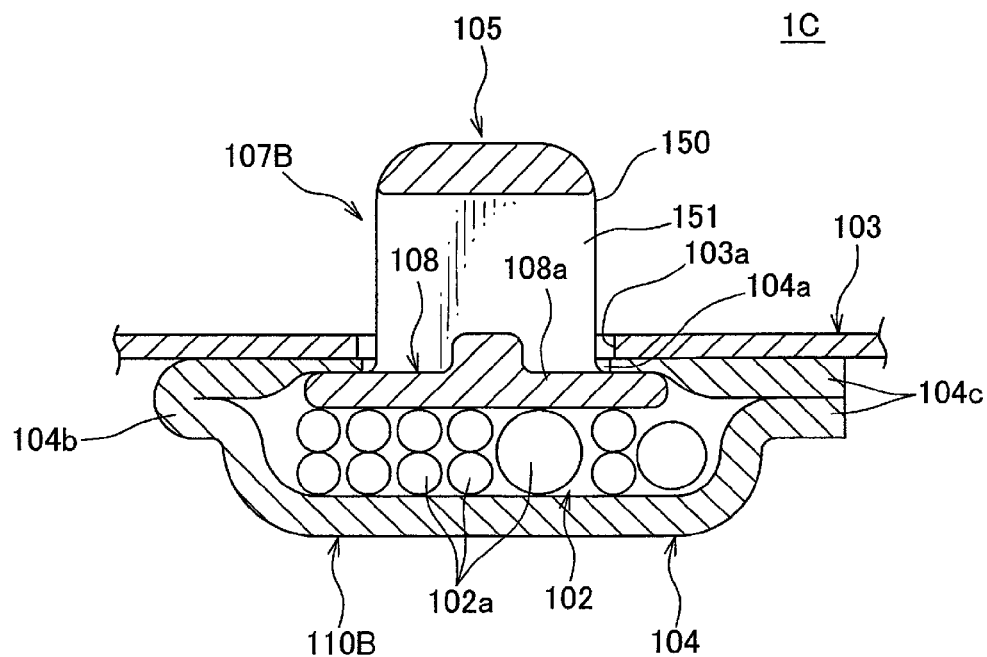

FIG. 23 is a cross-sectional view taken along a line N-N in FIG. 22.

Figure 24A:
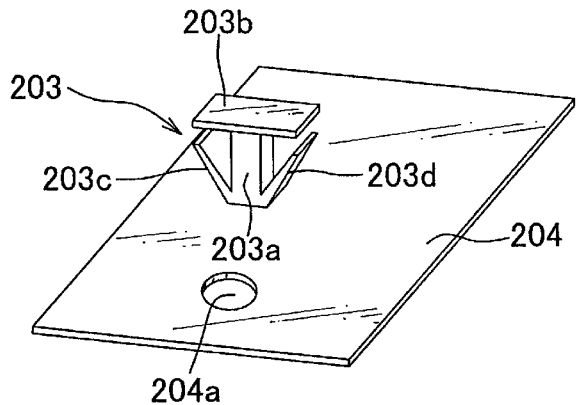

FIG. 24A illustrates a wire harness securing structure for securing a wire harness to a secured member using a conventional wire harness clip.

Figure 24B:
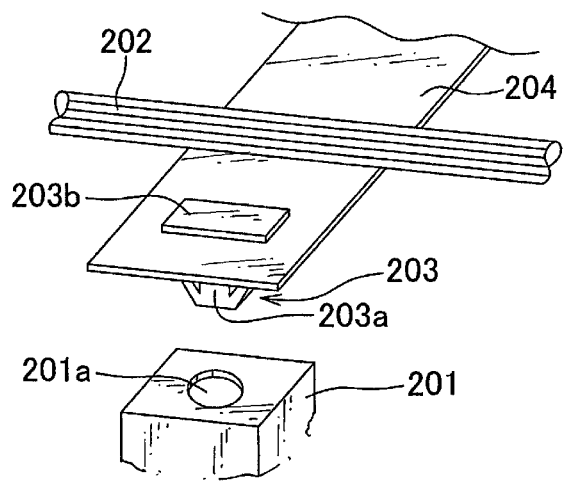

FIG. 24B illustrates a wire harness securing structure for securing a wire harness to a secured member using a conventional wire harness clip.

Figure 24C:
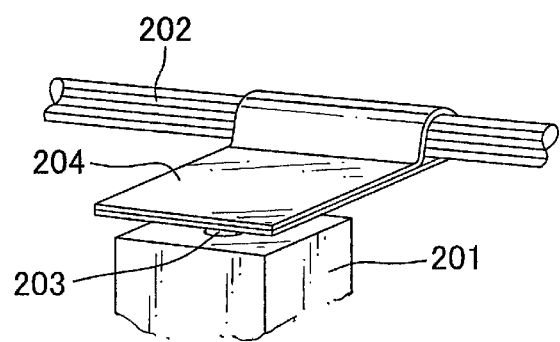

FIG. 24C illustrates a wire harness securing structure for securing a wire harness to a secured member using a conventional wire harness clip.

Figure 25:
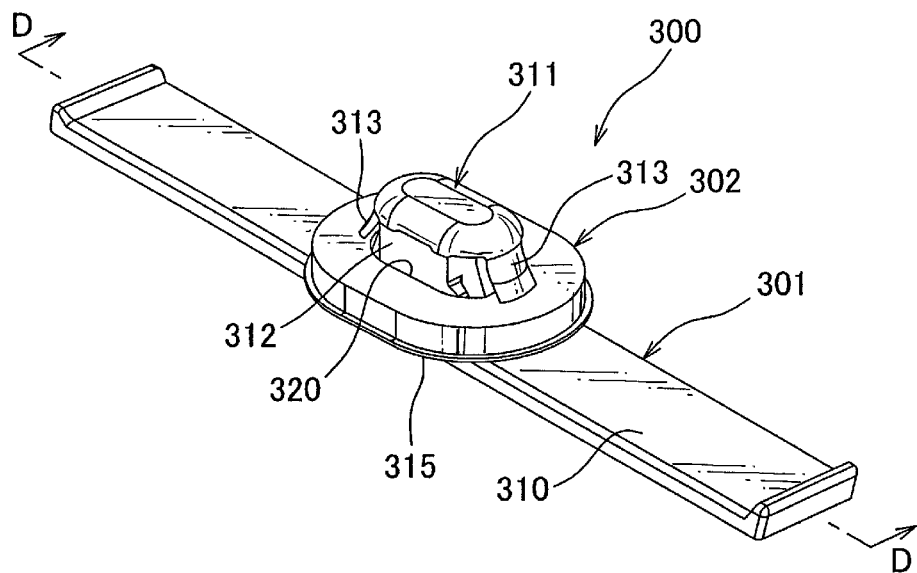

FIG. 25 is a perspective view showing another conventional wire harness clip.

Figure 26:
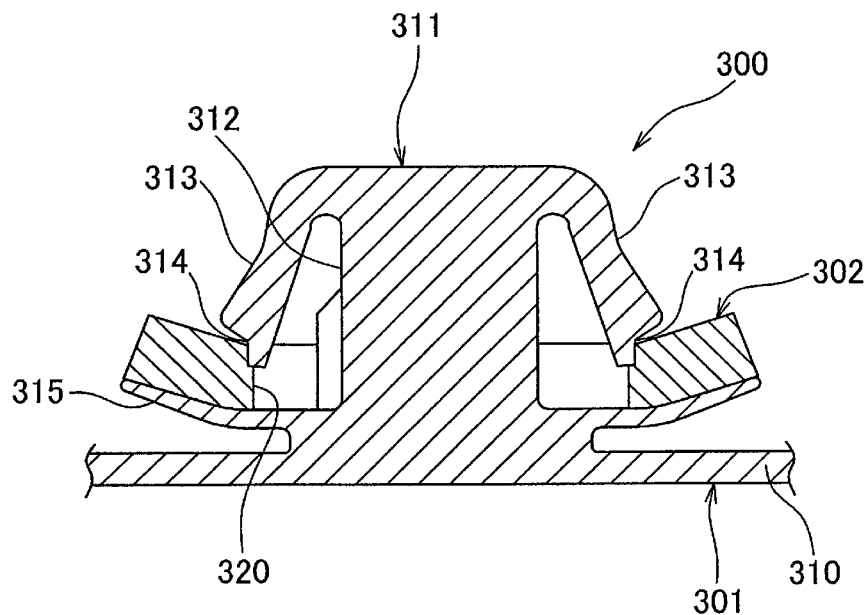

FIG. 26 is a cross-sectional view taken along a line D-D in FIG. 25.

Figure 27:
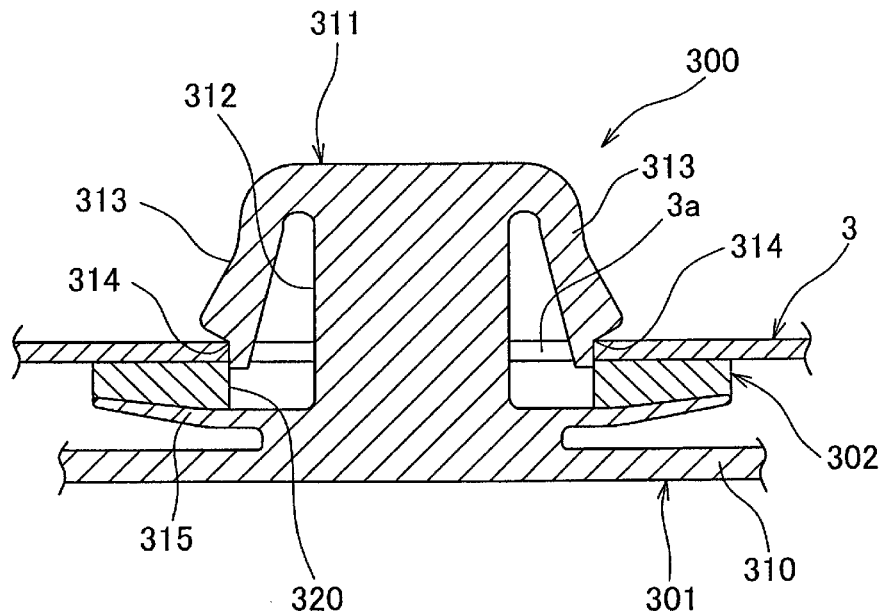

FIG. 27 is a cross-sectional view showing a state in which a latch portion of the wire harness clip shown in FIGS. 25, 26 is press-fitted and latched to a hole of a panel.

Figure 28:
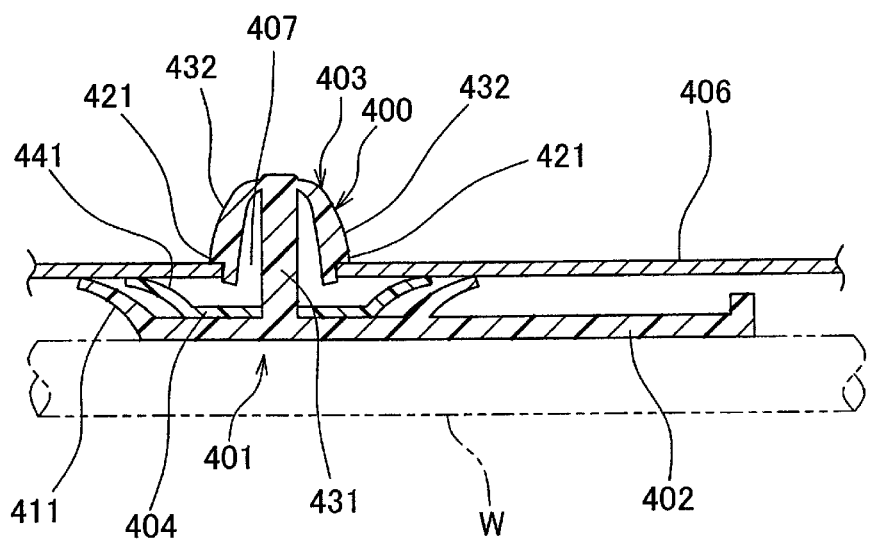

FIG. 28 illustrates a wire harness securing structure for securing a wire harness to a secured member using another conventional wire harness clip.

DESCRIPTION OF EMBODIMENTS

First Embodiment

In the following, a "wire harness securing structure" according to a first embodiment of the present invention is explained with reference to FIGS. 1 through 9.

Figure 9:
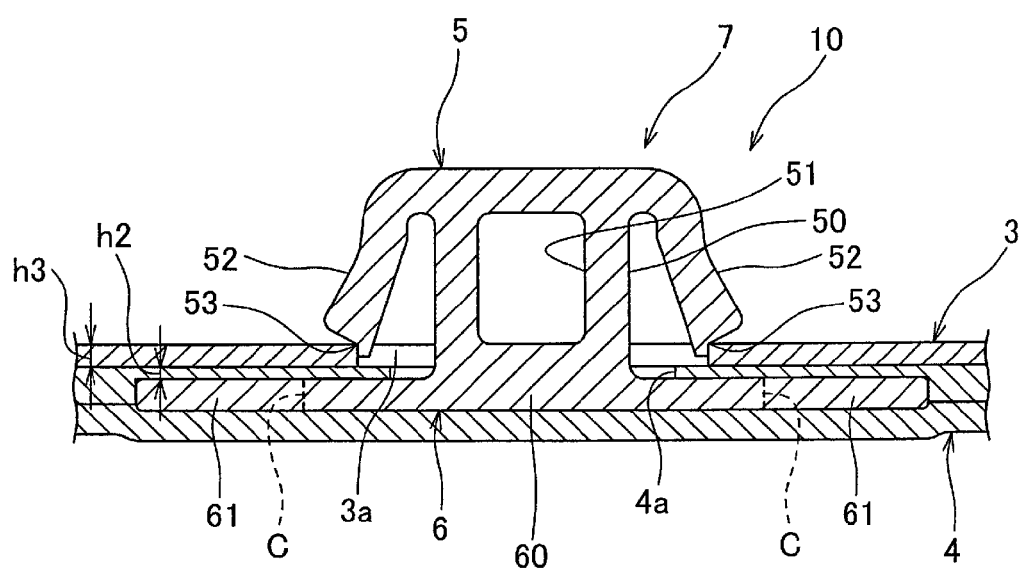
FIG. 9 is a cross-sectional view showing a state in which a latch portion of the wire harness clip shown in FIG. 8 is press-fitted and latched to a hole of the panel.
Figure 10:
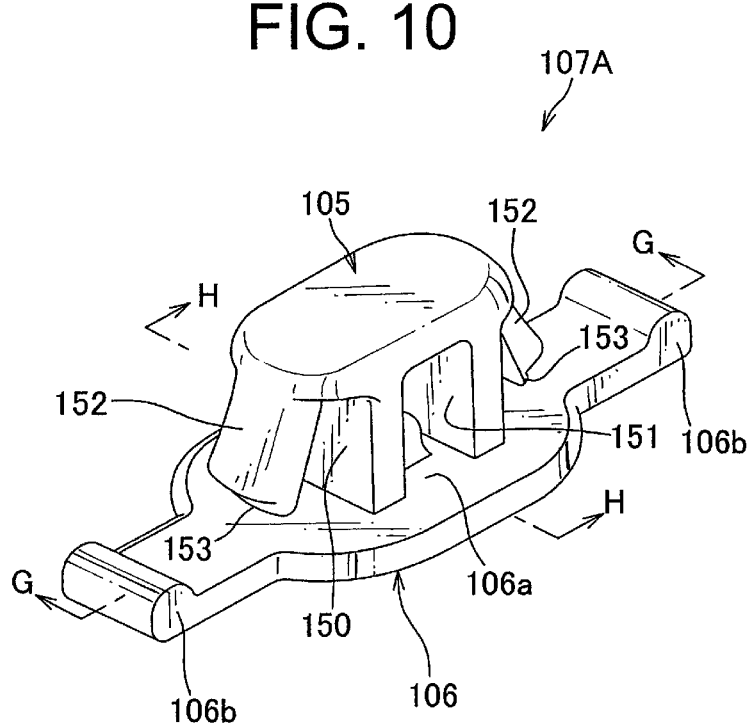
FIG. 10 is a perspective view showing a wire harness clip that constitutes a wire harness securing structure according to a second embodiment of the present invention.
Figure 11:
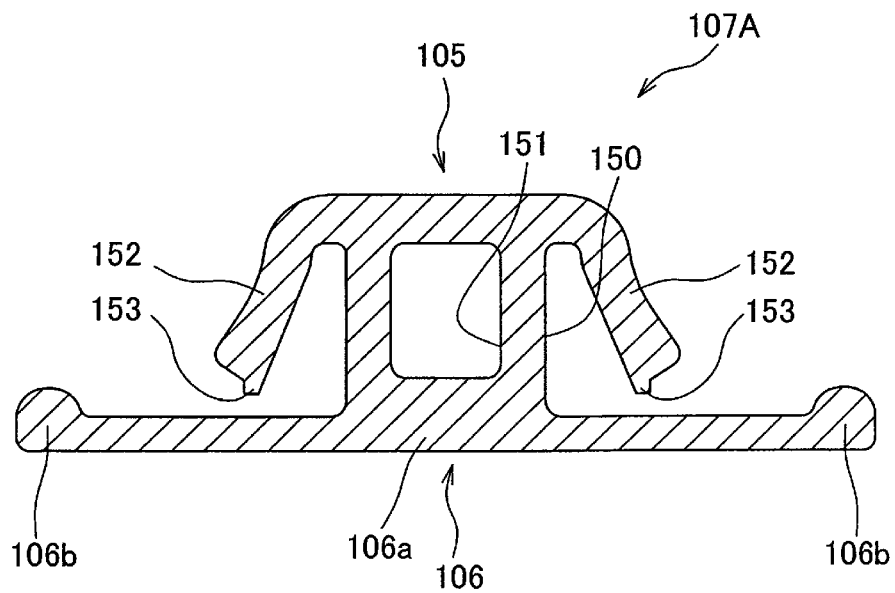
FIG. 11 is a cross-sectional view taken along a line G-G in FIG. 10.
Figure 12:
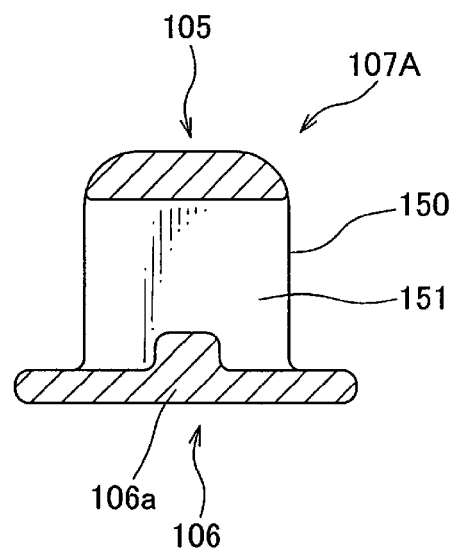
FIG. 12 is a cross-sectional view taken along a line H-H in FIG. 10.

A wire harness securing structure 1A according to the present invention shown in FIG. 9 is a structure for securing a wire harness 2 to a panel 3 using a wire harness clip 7 and a self-adhesive sheet 4 (corresponds to "adhesive sheet" in claims).

The wire harness 2 is a wire harness to be wired in a vehicle and is formed by bundling a plurality of electric wires 2a. Alternatively, in the present invention, the wire harness may be formed with a single electric wire.

Figure 7:
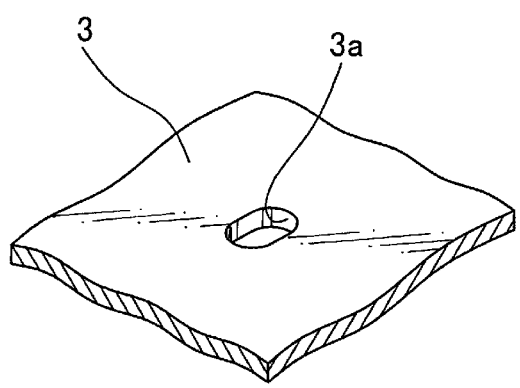
FIG. 7 is a perspective view showing a panel that constitutes the wire harness securing structure according to the first embodiment of the present invention.

The panel 3 is a vehicle body panel of the vehicle. As shown in FIGS. 7 and 9, this panel 3 is provided with an elliptical hole 3a. In FIG. 9, an upper side of the panel 3 corresponds to an outer side of the vehicle, and a lower side of the panel 3 corresponds to an inner side of the vehicle.

The wire harness clip 7 is made of synthetic resin. As shown in FIGS. 1 to 4, the wire harness clip 7 integrally includes a plate portion 6 and a latch portion 5. The plate portion 6 has a flat plate-like base portion 60 and a pair of extended portions 61 extending away from each other from both longitudinal ends of the base portion 60. The latch portion 5 is provided at the base portion 60 and is arranged to be press-fitted and latched to the hole 3a of the panel 3.

Figure 1:
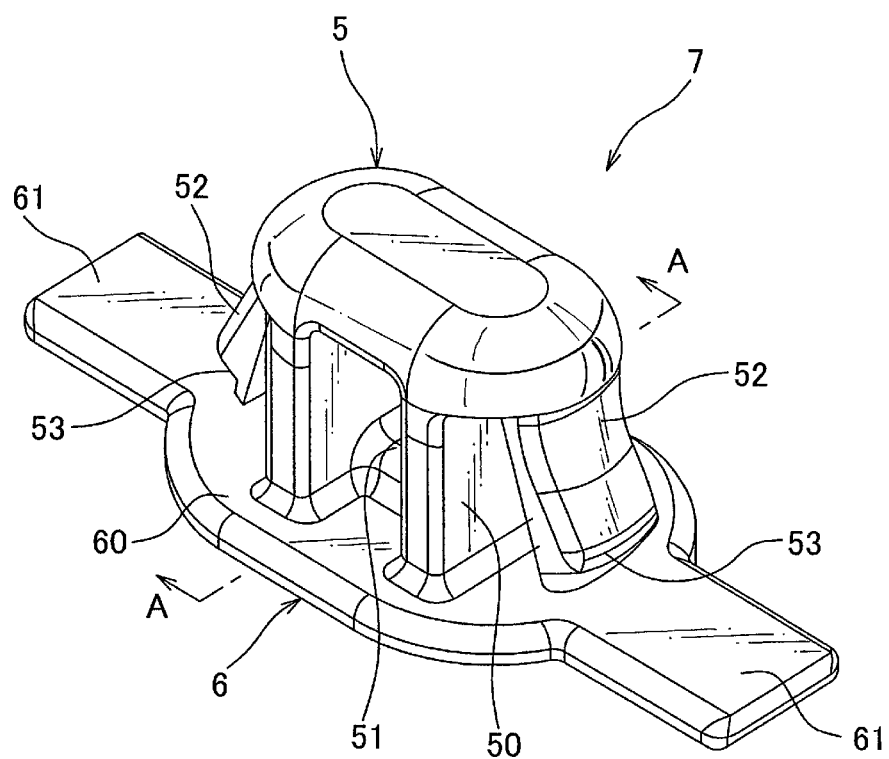
FIG. 1 is a perspective view showing a wire harness clip that constitutes a wire harness securing structure according to a first embodiment of the present invention.
Figure 2:
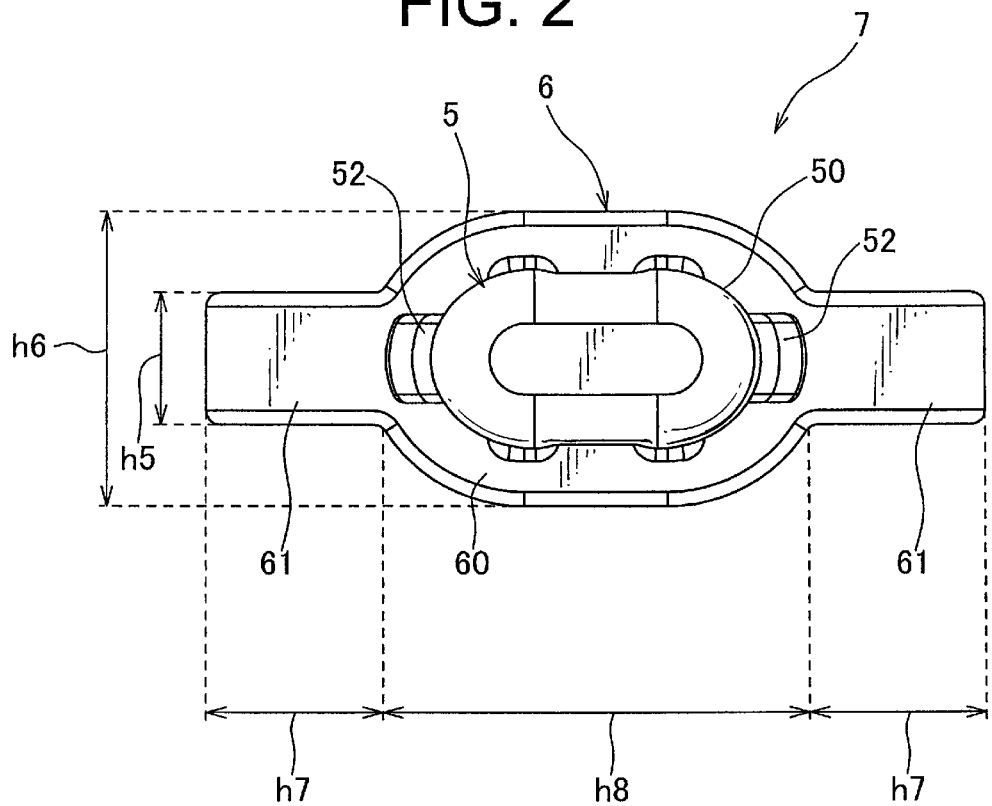
FIG. 2 is a top view of the wire harness clip shown in FIG. 1.

As shown in FIG. 2, the pair of extended portions 61 has a length (indicated by a reference sign h7 in FIG. 2) which is formed shorter than a length of the base portion 60 (indicated by a reference sign h8 in FIG. 2) and has a width (indicated by a reference sign h5 in FIG. 2) which is formed narrower than a width of the base portion 60 (indicated by a reference sign h6 in FIG. 2).

The base portion 60 has an elliptical planar shape with four rounded corners. Also, the base portion 60 is formed into the elliptical shape which is larger than the hole 3a of the panel 3.

Figure 3:
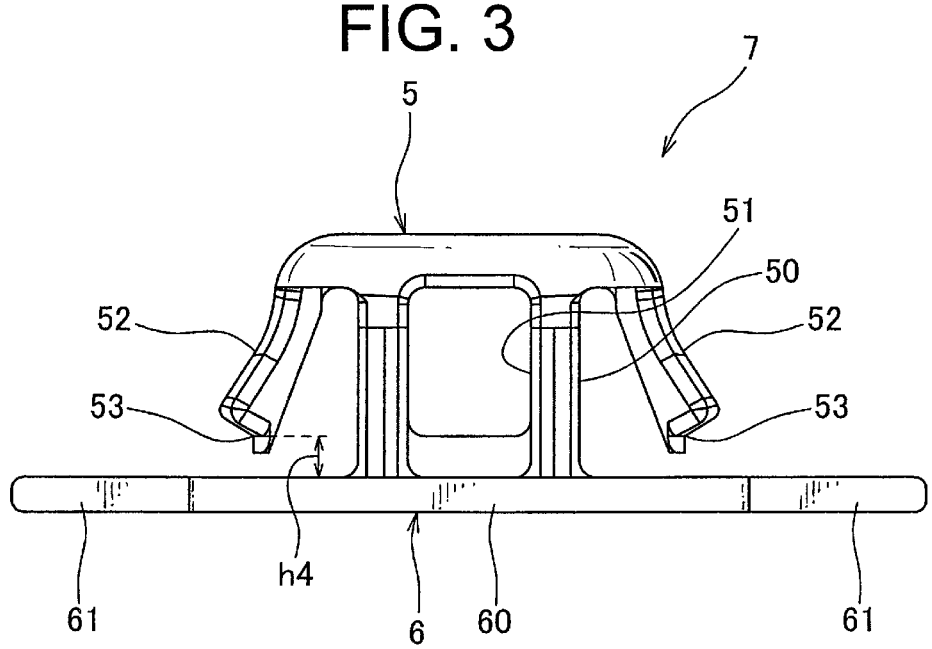
FIG. 3 is a front view of the wire harness clip shown in FIG. 1.
Figure 4:
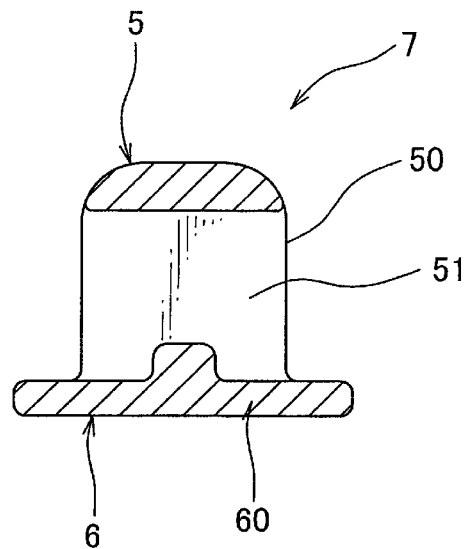
FIG. 4 is a cross-sectional view taken along a line A-A in FIG. 1.

As shown in FIG. 3, the latch portion 5 includes a support post 50 extending upward from a surface of the base portion 60 facing the panel 3 and a pair of latch pieces 52 extending from a distal end of the support post 50 toward the base portion 60. The pair of latch pieces 52 is extending at a slant with respect to an extending direction of the support post 50 such that the distance between the pair of latch pieces 52 is increased as they extend from the distal end of the support post 50 toward the base portion 60. The distal end of each latch piece 52 is provided with a step-like latch shoulder portion 53.

The support post 50 is provided with a drainage hole 51. The drainage hole 51 penetrates through the support post 50 in the widthwise direction of the base portion 60.

Such latch portion 5 is press-fitted into the hole 3a of the panel 3 from the distal end of the support post 50 and the respective latch shoulder portions 53 of the pair of latch pieces 52 are engaged with an edge of the hole 3a, thereby latching the latch portion 5 to the hole 3a. At this time, the pair of latch pieces 52 is inserted into the hole 3a of the panel 3 while being elastically deformed toward each other, and after that, the pair of latch pieces 52 is restored in some degree to a state before being elastically deformed, by which the respective latch shoulder portions 53 are engaged with the edge of the hole 3a. In the present invention, the latch portion does not need to have the latch pieces 52 in a pair, but may have at least one latch piece 52.

Figure 5:
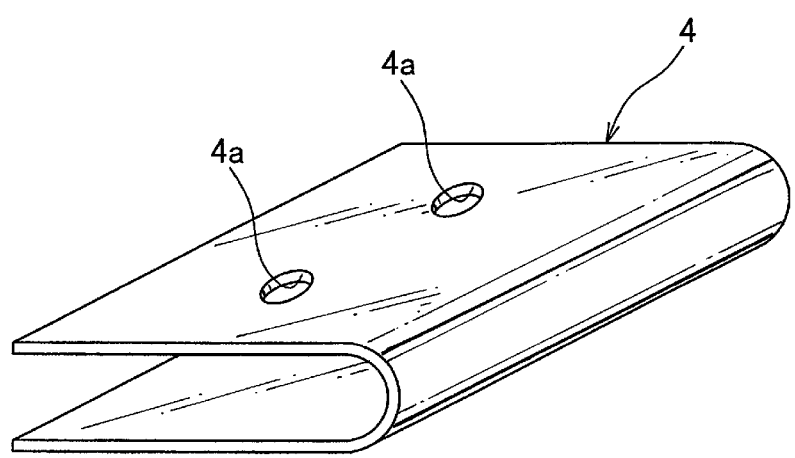
FIG. 5 is a perspective view showing a self-adhesive sheet that constitutes the wire harness securing structure according to the first embodiment of the present invention.
Figure 6:
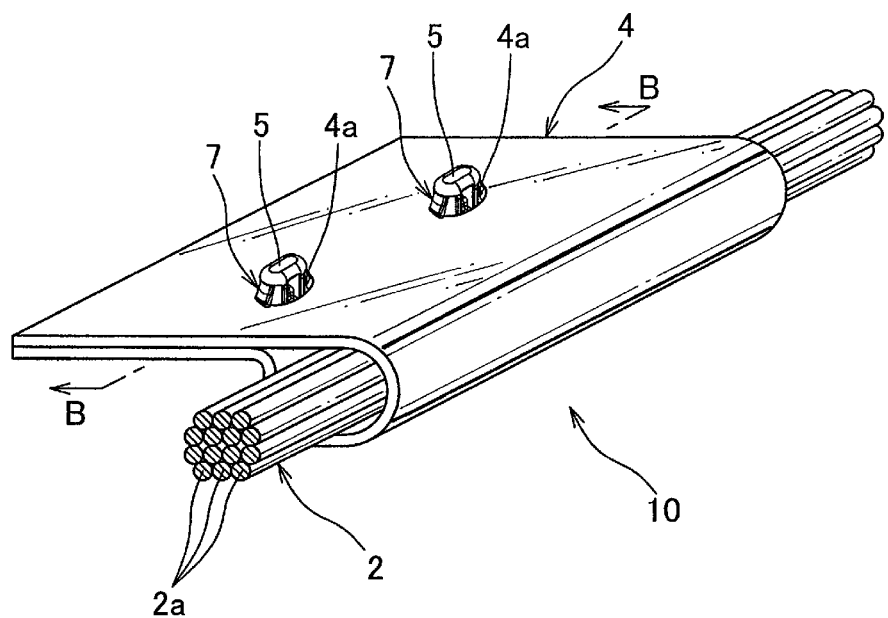
FIG. 6 is a perspective view showing a state in which the wire harness clip shown in FIG. 1 and a wire harness are covered with the self-adhesive sheet.

The plate portion 6 of the wire harness clip 7 and the wire harness 2 are secured by being covered with the self-adhesive sheet 4 shown in FIG. 5. As shown in FIG. 6, in this embodiment, the plate portion 6 and the wire harness 2 are secured by the self-adhesive sheet 4 with the plate portion 6 and the wire harness 2 being arranged parallel to each other and spaced from each other. In addition, in the present invention, the plate portion 6 is secured to the wire harness 2 with the plate portion 6 being placed along the wire harness 2.

Herein, the combination of the wire harness clip 7 and the wire harness 2 secured by the self-adhesive sheet 4 is called "the wire harness with clip" and is indicated by a reference sign 10.

The self-adhesive sheet 4 is a sheet having one face being an adhesive face. This self-adhesive sheet 4 is self-adhesive so that its adhesive face is adhered to each other when contacted each other. The adhesive face does not adhere to other members such as the wire harness clip 7 and the wire harness 2. Furthermore, the self-adhesive sheet 4 is provided with a through hole 4a through which the latch portion 5 is passed. This through hole 4a is formed into an elliptical shape and has a dimension that is smaller than the dimension of the hole 3a of the panel 3.

Furthermore, the self-adhesive sheet 4 has elasticity so the self-adhesive sheet 4 shrinks in its thickness direction when applied with pressure and its thickness is restored when the pressure is released. Also, a face of the self-adhesive sheet 4 on opposite side of the adhesive face functions as a waterproof face when the self-adhesive sheet 4 is compressed. In this embodiment, the self-adhesive sheet 4 is made of a polyethylene foaming material and has a thickness (which is indicated by the reference sign h1 in FIG. 8) of 2.40 mm In the present invention, the self-adhesive sheet may be made of materials other than polyethylene foaming material such as rubber, elastomer and other synthetic resin, as long as the self-adhesive sheet has the elasticity and the surface waterproof property when compressed as described above. Furthermore, the present invention may employ not only the self-adhesive sheet but various adhesive sheets such as the one coated with an adhesive agent, as long as the adhesive sheet has the elasticity and the surface waterproof property when compressed as described above.

When securing the wire harness clip 7 and the wire harness 2 using such self-adhesive sheet 4, firstly, the wire harness clip 7 is attached to the self-adhesive sheet 4 by passing the latch portion 5 through the through hole 4a, and then covering the wire harness 2 with this self-adhesive sheet 4. Furthermore, in this embodiment, the self-adhesive sheet 4 is folded in half, and the wire harness 2 is positioned at the folded portion of the self-adhesive sheet 4 and both ends of the self-adhesive sheet 4 are contacted each other, thereby covering and securing the entire plate portion 6 and the wire harness 2 by the self-adhesive sheet 4.

As described above, according to the present invention, the self-adhesive sheet 4 is provided with the through hole 4a through which the latch portion 5 is passed. Thus, the plate portion 6 and the wire harness 2 can be easily covered with the self-adhesive sheet 4, thereby providing the wire harness with clip 10 and the wire harness securing structure 1A having uniform quality.

Furthermore, in the present invention, when covering the wire harness clip 7 and the wire harness 2 with the self-adhesive sheet 4, the distance between the wire harness clip 7 and the wire harness 2 can be set to a desired distance. Thus, the wiring path of the wire harness 2 can be optimized. Therefore, the wiring work of the wire harness 2 can be facilitated.

Moreover, the wire harness securing structure 1A according to the present invention is arranged such that the wire harness clip 7 is covered with the self-adhesive sheet 4. Thus, it is not necessary to make the length of the plate portion 6 to be long to facilitate the wrapping of the tape as it was in the case of the conventional wire harness clip (refer to FIGS. 25 to 27), thus the length of the plate portion 6 can be shorter than that of the conventional product. Therefore, in the case an object is placed near the hole 3a of the panel 3, the plate portion 6 does not interfere with that object, thus the wiring work of the wire harness 2 can be facilitated. Furthermore, in the wire harness clip 7 of the present invention, the entire length of the plate portion 6 is shorter than three times of the length of the base portion 60. In contrast, the conventional wire harness clip which includes the tape wound around the plate portion requires the entire length of the plate portion to be equal to or longer than three times the length of the base portion (in case of the wire harness clip 300 shown in FIG. 25, the entire length of the plate portion 310 is required to be equal to or longer than three times the length of the vane portion 315).

The wire harness with clip 10, which is assembled by covering the entire plate portion 6 and the wire harness 2 with the self-adhesive sheet 4 as described above, is secured to the panel 3 by press-fitting and latching the latch portion 5 of the wire harness clip 7 to the hole 3a of the panel 3 so the panel 3 is sandwiched between the pair of latch pieces 52 and the plate portion 6.

Figure 8:
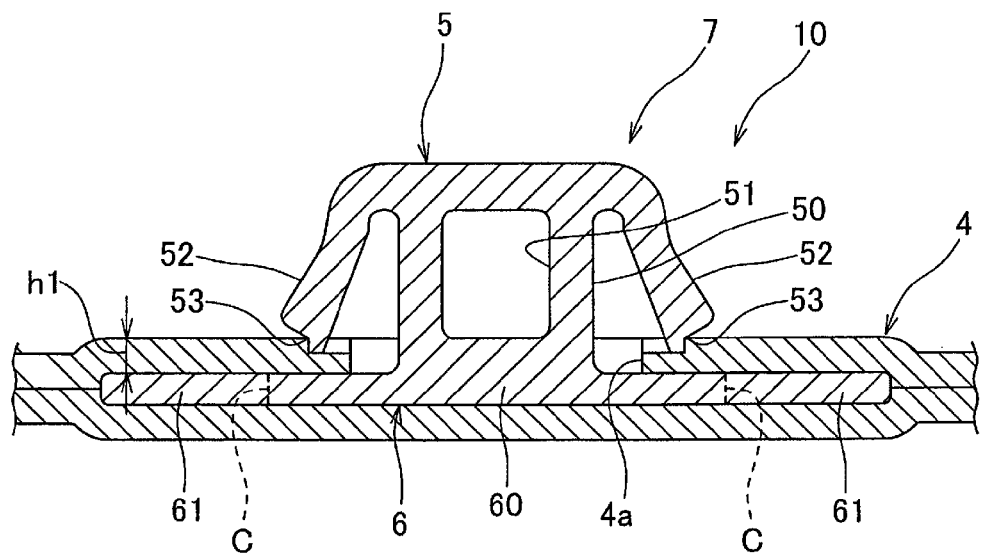
FIG. 8 is a cross-sectional view taken along a line B-B in FIG. 6.

Furthermore, as shown in FIG. 8, in a state before the latch portion 5 is press-fitted and latched to the hole 3a of the panel 3, a surface of the self-adhesive sheet 4 facing the panel 3 and the latch shoulder portion 53 at the distal ends of the pair of latch pieces 52 are in elastic contact with each other. Then, as shown in FIG. 9, the latch portion 5 is press-fitted and latched to the hole 3a of the panel 3, and the latch shoulder portions 53 at the distal ends of the pair of latch pieces 52 are engaged with the edge of the hole 3a, by which the self-adhesive sheet 4 between the plate portion 6 and the panel 3 is compressed in a direction away from the latch shoulder portion 53 and contacts firmly with the outer periphery portion of the hole 3a. Thus, good sealing performance for the hole 3a of the panel 3 can be maintained. As a result, water and dust can be prevented from entering inside of the vehicle from outside of the vehicle.

In other words, in the wire harness securing structure 1A, the self-adhesive sheet 4 between the plate portion 6 and the panel 3 is compressed for at least about the thickness of the panel 3. In addition, in this embodiment, the distance between the latch shoulder portion 53 and the base portion 60 (indicated by h4 in FIG. 3) is formed to be 1.35 mm, and the thickness of the panel 3 (indicated by h3 in FIG. 9) is formed to be 0.70 to 0.80 mm, and the thickness of the compressed self-adhesive sheet 4 (indicated by h2 in FIG. 9) is formed to be 0.55 to 0.65 mm. That is, the thickness of the self-adhesive sheet 4 before being compressed (indicated by h1 in FIG. 8) is 2.40 mm, thus this self-adhesive sheet 4 is compressed for 1.75 to 1.85 mm.

As described above, in the present invention, the self-adhesive sheet 4 which is arranged to secure the wire harness clip 7 and the wire harness 2 is used in place of a packing. Thus, there is no need to attach a waterproof packing to the wire harness clip 7, thereby reducing the height of the wire harness clip 7 and the wire harness securing structure 1A.

Furthermore, in the wire harness securing structure 1A, the through hole 4a of the self-adhesive sheet 4 is formed to have a dimension that is smaller than the dimension of the hole 3a of the panel 3. Thus, the sealing performance for the hole 3a of the panel 3 can be improved even more. However, in the present invention, since the self-adhesive sheet 4 is widely in close contact with the outer periphery portion of the hole 3a of the panel 3, the dimension of the through hole 4a does not necessarily have to be smaller than the dimension of the hole 3a, and the high sealing performance can be achieved even if the dimension of the through hole 4a is formed larger than the dimension of the hole 3a.

Furthermore, in the present invention, the self-adhesive sheet 4 is widely in close contact with the outer periphery portion of the hole 3a of the panel 3 as described above. Thus, even if the center of the through hole 4a of the self-adhesive sheet 4 is slightly displaced with respect to the center of the latch portion 5 of the wire harness clip 7, the high sealing performance can be achieved.

Moreover, in the present invention, the width of the pair of extended portions 61 is arranged to be narrower than the width of the base portion 60. Thus, while in a state in which the latch portion 5 is press-fitted and latched to the hole 3a of the panel 3 (i.e. a state shown in FIG. 9), if the self-adhesive sheet 4 is deformed due to the pulling of the wire harness 2, for example, and the load is applied on both ends of the plate portion 6, i.e. on the pair of extended portions 61, the elastic deformation of the pair of extended portions 61 is hardly transmitted to the central portion of the plate portion 6, i.e. to the base portion 60. Thus, the amount of deformation of the base portion 60 can be reduced.

As described above, in the present invention, the amount of deformation of the base portion 60 can be reduced. Thus, the amount of deformation of the latch portion 5 which is continuous with the base portion 60 can be reduced as well, thereby preventing the latch portion 5 from being detached from the hole 3a of the panel 3 and preventing the wire harness 2 from dropping off from the panel 3. Furthermore, as shown in FIG. 9, the base portion 60 corresponds to a portion at which the self-adhesive sheet 4 is pushed against the outer periphery portion of the hole 3a of the panel 3 (the dotted lines C in FIG. 9 indicate both ends of the base portion 60), thus the amount of deformation of the base portion 60 can be reduced, thereby maintaining good sealing performance for the hole 3a of the panel 3.

Furthermore, in the present invention, the drainage hole 51 is provided at the support post 50 of the wire harness clip 7. Thus water (e.g. wash fluid and rainwater) can be prevented from pooling on a surface of the support post 50 and flowing along the surface of the support post 50 and entering inside of the vehicle from the hole 3a of the panel 3. Moreover, in this embodiment, in a state in which the latch portion 5 is press-fitted and latched to the hole 3a of the panel 3, the pair of latch pieces 52 is arranged in a horizontal direction at an interval, and the drainage hole 51 is penetrating through the support post 50 in the vertical direction. Thus, it is preferable that, in a state in which the latch portion 5 is press-fitted and latched to the hole 3a of the panel 3, the drainage hole 51 of the present invention is penetrating through the support post 50 in the vertical direction.

Second Embodiment

In the following, a "wire harness securing structure" according to a second embodiment of the present invention is explained with reference to FIGS. 10 through 16.

Figure 15:
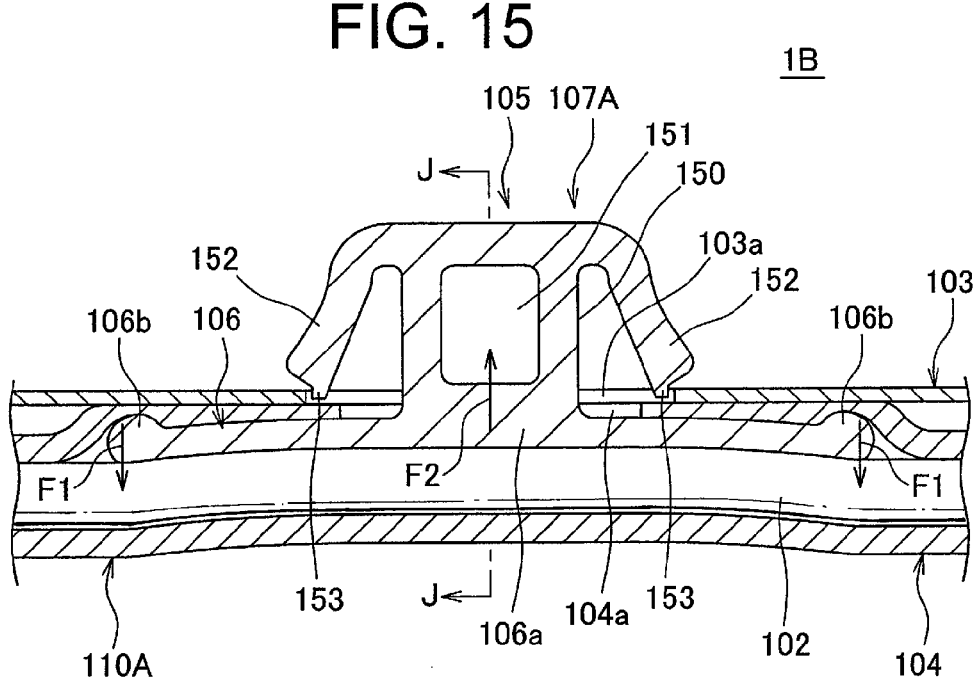
FIG. 15 is a cross-sectional view showing a state in which a latch portion of the wire harness clip shown in FIG. 13 is press-fitted and latched to a hole of a panel.
Figure 16:
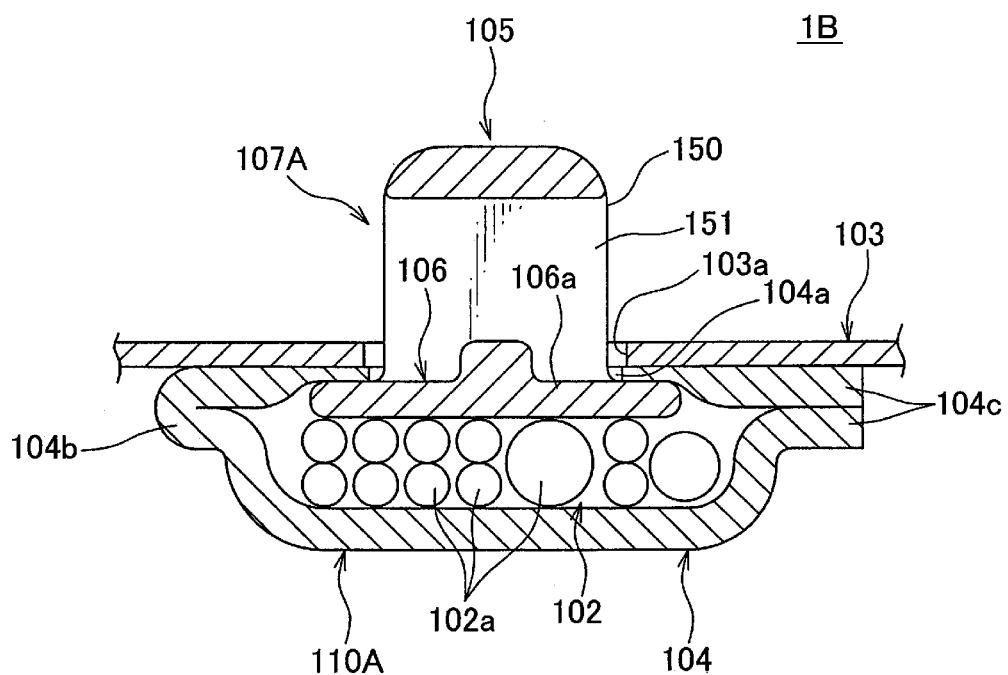
FIG. 16 is a cross-sectional view taken along a line J-J in FIG. 15.
Figure 17:
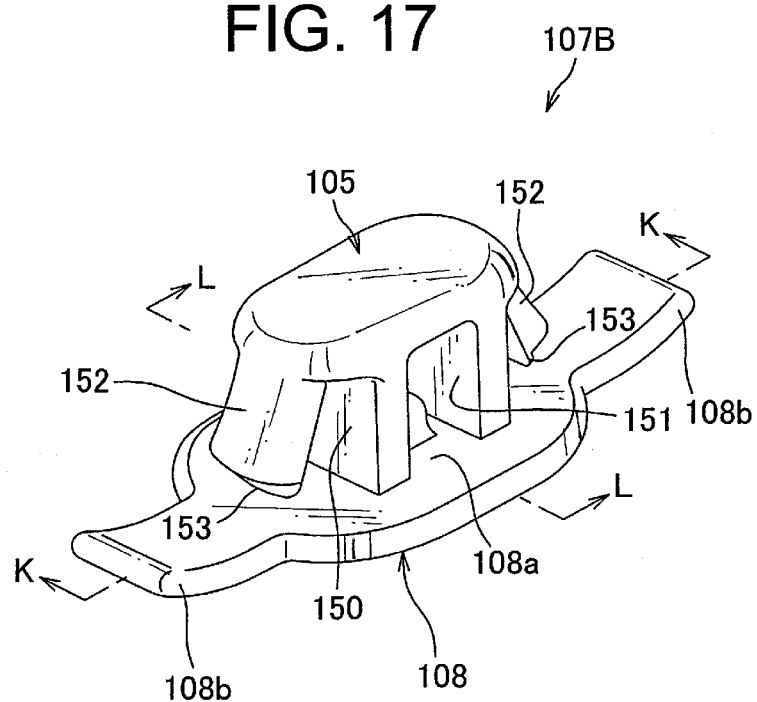
FIG. 17 is a perspective view showing a wire harness clip that constitutes a wire harness securing structure according to a third embodiment of the present invention.
Figure 18:
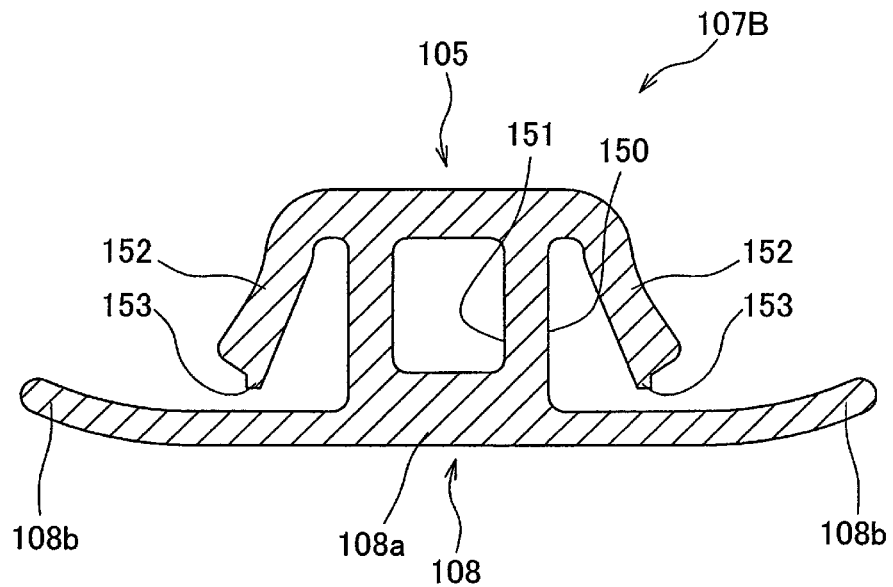
FIG. 18 is a cross-sectional view taken along a line K-K in FIG. 17.
Figure 19:
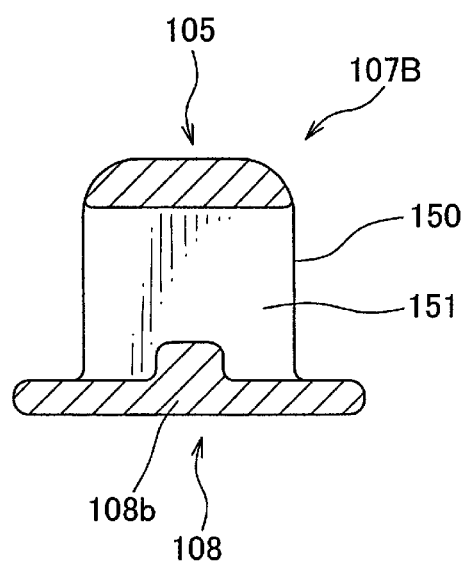
FIG. 19 is a cross-sectional view taken along a line L-L in FIG. 17.

A wire harness securing structure 1B according to the present invention shown in FIGS. 15 and 16 is a structure for securing a wire harness 102 to a panel 103 using a wire harness clip 107A. The wire harness 102 is a wire harness to be wired in a vehicle and is formed by bundling a plurality of electric wires 102a. Alternatively, in the present invention, the wire harness may be formed with a single electric wire. The panel 103 is a vehicle body panel of the vehicle. In FIGS. 15 and 16, an upper side of the panel 103 corresponds to an outer side of the vehicle, and a lower side of the panel 103 corresponds to an inner side of the vehicle.

The wire harness clip 107A is made of synthetic resin. As shown in FIGS. 10 to 14, the wire harness clip 107A integrally includes a plate portion 106 formed into a plate and a latch portion 105 provided at a central portion 106a of the plate portion 106 and arranged to be press-fitted and latched to the hole 103a of the panel 103 (refer to FIGS. 15, 16).

Surfaces of both longitudinal ends 106b of the plate portion 106 facing the panel 103 are formed into a projection and projecting toward the panel 103. The entire plate portion 106 and the wire harness 102 are covered with the self-adhesive sheet 104 (also called "the elastic sheet"), by which the plate portion 106 is secured to the wire harness 102. In addition, the plate portion 106 is secured to the wire harness 102 with a surface of the plate portion 106 on the opposite side of the panel 103 being placed along the wire harness 102.

Herein, the combination of the wire harness clip 107A and the wire harness 102 secured by the self-adhesive sheet 104 is called "the wire harness with clip" and is indicated by a reference sign 110A.

The latch portion 105 includes a support post 150 extending upward from a surface of a central portion 106a of the base portion 160 facing the panel 103 and a pair of latch pieces 152 extending from a distal end of the support post 150 toward the base portion 160. The support post 150 is provided with a drainage hole 151. The pair of latch pieces 152 is extending at a slant with respect to an extending direction of the support post 150 such that the distance between the pair of latch pieces 152 is increased as they extend from the distal end of the support post 150 toward the base portion 160. The distal end of each latch piece 152 is provided with a step-like latch shoulder portion 153.

Such latch portion 105 is press-fitted into the hole 103a of the panel 103 from the side of the distal end of the support post 150 and the respective latch shoulder portions 153 of the pair of latch pieces 152 are engaged with an edge of the hole 103a, thereby latching the latch portion 105 to the hole 103a. At this time, the pair of latch pieces 152 is inserted into the hole 103a of the panel 103 while being elastically deformed toward each other, and then the pair of latch pieces 152 is restored in some degree to a state before being elastically deformed, and the respective latch shoulder portions 153 are engaged with the edge of the hole 103a.

The self-adhesive sheet 104 is a sheet having one face being an adhesive face. This self-adhesive sheet 104 is self-adhesive so that its adhesive face is adhered to each other when contacted each other. The adhesive face does not adhere to other members such as the wire harness clip 107A and the wire harness 102. Furthermore, the self-adhesive sheet 104 is provided with a through hole 104a through which the latch portion 105 is passed. This through hole 104a is formed into an elliptical shape and has a dimension that is smaller than the dimension of the hole 103a of the panel 103.

Furthermore, the self-adhesive sheet 104 has elasticity so the self-adhesive sheet 104 shrinks in its thickness direction when applied with pressure and its thickness restores when the pressure is released. Also, a face of the self-adhesive sheet 4 on opposite side of the adhesive face functions as a waterproof face when the self-adhesive sheet 104 is being compressed. In this embodiment, the self-adhesive sheet 104 is made of a polyethylene foaming material and has a thickness of about 2 mm.

In the present invention, the self-adhesive sheet may be made of materials other than polyethylene foaming material such as rubber, elastomer and other synthetic resin, as long as the self-adhesive sheet has the above-described elasticity and the surface waterproof property when compressed. Furthermore, the present invention may employ not only the self-adhesive sheet but various elastic sheets such as the one coated with an adhesive agent, as long as the elastic sheet has the above-described elasticity and the surface waterproof property when compressed.

Figure 14:
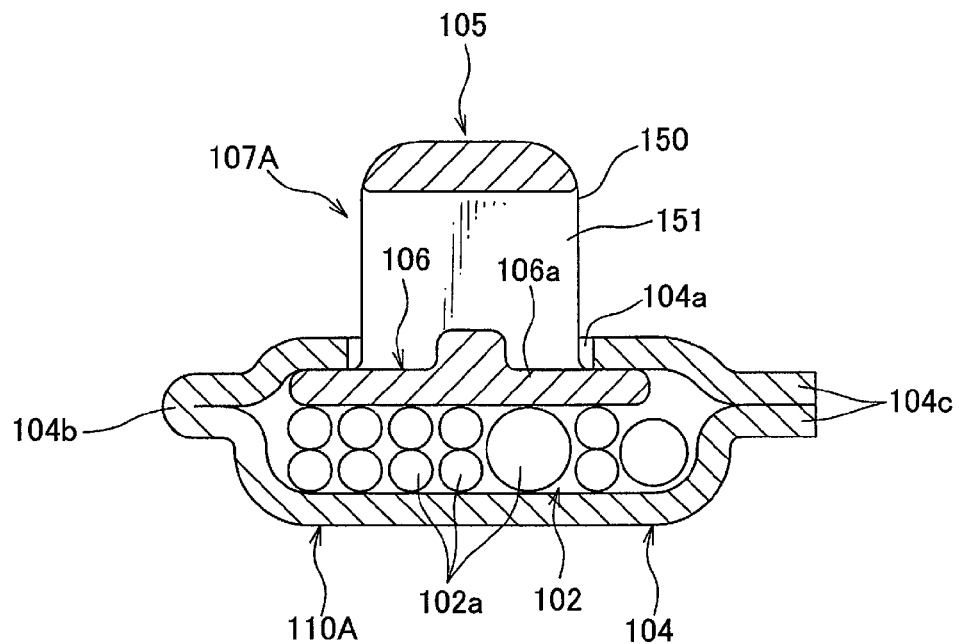
FIG. 14 is a cross-sectional view taken along a line I-I in FIG. 13.

When securing the wire harness clip 107A and the wire harness 102 using such self-adhesive sheet 104, firstly, the wire harness clip 107A is attached to the self-adhesive sheet 104 by passing the latch portion 105 through the through hole 104a, and after that the wire harness 102 is covered with this self-adhesive sheet 104. Furthermore, in this embodiment, as shown in FIGS. 14 and 16, the self-adhesive sheet 104 is folded in half so that portions near a folded portion 104b of the self-adhesive sheet 104 are contacted each other and both ends 104c of the self-adhesive sheet 104 are contacted each other, thereby covering and securing the entire plate portion 106 and the wire harness 102 by the self-adhesive sheet 104.

Figure 13:
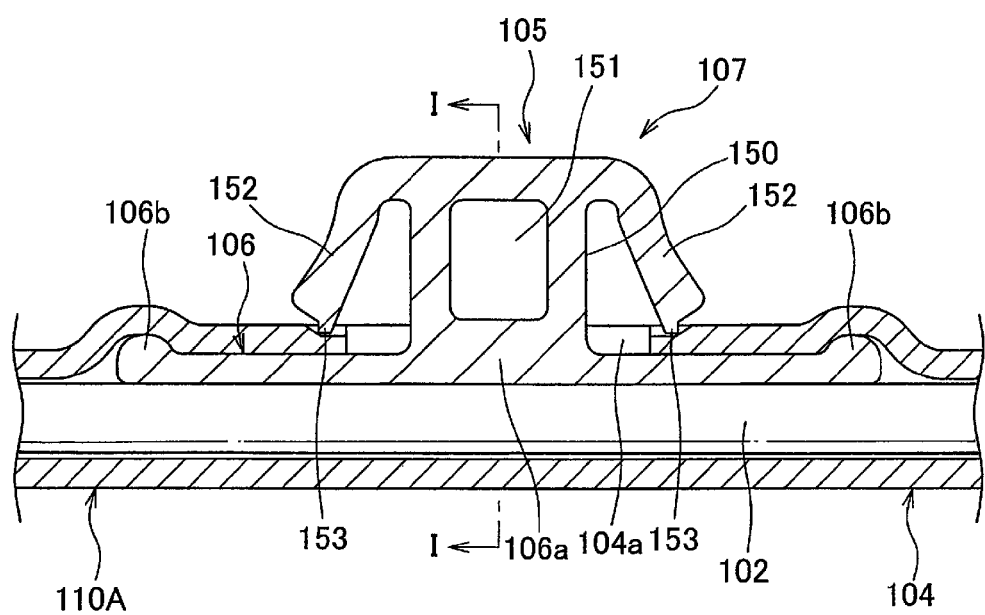
FIG. 13 is a cross-sectional view showing a state in which the wire harness clip shown in FIG. 11 and a wire harness are covered and secured by a self-adhesive sheet.

The wire harness with clip 110A, which is assembled by covering the entire plate portion 106 and the wire harness 102 with the self-adhesive sheet 104 as described above, is secured to the panel 103 by press-fitting and latching the latch portion 105 of the wire harness clip 107A to the hole 103a of the panel 103 so the panel 103 is sandwiched between the pair of latch pieces 152 and the plate portion 106. Furthermore, as shown in FIG. 13, in a state before the latch portion 105 is press-fitted and latched to the hole 103a of the panel 103, surfaces of the both ends 106b of the plate portion 106 facing the panel 103 are positioned closer to the panel 103 than a surface of the central portion 106a of the plate portion 106 facing the panel 103. Thus, when the latch portion 105 is press-fitted and latched to the hole 103a of the panel 103, the plate portion 106 is elastically deformed and the self-adhesive sheet 104 between the plate portion 106 and the panel 103 is compressed and contacts firmly with the outer periphery portion of the hole 103a.

To explain more, as shown in FIG. 15, once the latch portion 105 is press-fitted and latched to the hole 103a of the panel 103, the both ends 106b of the plate portion 106 are pushed against the panel 103 with the supporting points being the respective latch shoulders 153 of the pair of latch pieces 152 (in the drawing, an arrow F1 indicates a force applied to the both ends 106b), by which the central portion 106a of the plate portion 106 is pushed upward toward the panel 103 (in the drawing, an arrow F2 indicates a force generated at the central portion 106a). Thus, the self-adhesive sheet 104 located at the outer periphery portion of the panel 103 is pushed firmly against the panel 103, thereby maintaining good sealing performance for the hole 103a of the panel 103. Thus, water or dust can be prevented from entering inside of the vehicle from outside of the vehicle.

As described above, according to the present invention, the wire harness securing structure 1B having a superior sealing performance for the hole 103a of the panel 103 can be provided by using a simple and inexpensive wire harness clip 107A. Furthermore, according to the present invention, since the self-adhesive sheet 104 is provided with the through hole 104a through which the latch portion 105 is passed, the plate portion 106 and the wire harness 102 can be easily covered with the self-adhesive sheet 104, thereby providing the wire harness securing structure 1B having uniform quality.

Third Embodiment

In the following, a wire harness securing structure according to a third embodiment of the present invention is explained with reference to FIGS. 17 to 23. In FIGS. 17 to 23, like elements are indicated by the same reference signs with the second embodiment described above to omit explanation.

A wire harness securing structure 1C according to the present invention shown in FIGS. 22 and 23 is a structure for securing a wire harness 102 to a panel 103 using a wire harness clip 107B. The wire harness 102 is a wire harness to be wired in a vehicle and is formed by bundling a plurality of electric wires 102a. Alternatively, in the present invention, the wire harness may be formed with a single electric wire. The panel 103 is a vehicle body panel of the vehicle. In FIGS. 22 and 23, an upper side of the panel 103 corresponds to an outer side of the vehicle, and a lower side of the panel 103 corresponds to an inner side of the vehicle.

The wire harness clip 107B is made of synthetic resin. As shown in FIGS. 17 to 21, the wire harness clip 107B integrally includes a plate portion 108 formed into a plate and a latch portion 105 provided at a central portion 108a of the plate portion 108 and arranged to be press-fitted and latched to the hole 103a of the panel 103 (refer to FIGS. 22, 23).

Both longitudinal ends 108b of the plate portion 108 are curved toward the panel 103. The entire plate portion 108 and the wire harness 102 are covered with the self-adhesive sheet 104 (also called "the elastic sheet"), by which the plate portion 108 is secured to the wire harness 102. In addition, the plate portion 108 is secured to the wire harness 102 with a surface of the plate portion 108 on the opposite side of the panel 103 being placed along the wire harness 102.

Herein, the combination of the wire harness clip 107B and the wire harness 102 secured by the self-adhesive sheet 104 is called "the wire harness with clip" and is indicated by a reference sign 110B.

In this embodiment, when securing the wire harness clip 107B and the wire harness 102 using the self-adhesive sheet 104, firstly, the wire harness clip 107B is attached to the self-adhesive sheet 104 by passing the latch portion 105 through the through hole 104a, and after that the wire harness 102 is covered with this self-adhesive sheet 104. In this embodiment also, as in the second embodiment, the self-adhesive sheet 104 is folded in half so that portions near a folded portion 104b of the self-adhesive sheet 104 are contacted each other and both ends 104c of the self-adhesive sheet 104 are contacted each other, thereby covering and securing the entire plate portion 108 and the wire harness 102 by the self-adhesive sheet 104.

The wire harness with clip 110B, which is assembled by covering the entire plate portion 108 and the wire harness 102 with the self-adhesive sheet 104 as described above, is secured to the panel 103 by press-fitting and latching the latch portion 105 of the wire harness clip 107B to the hole 103a of the panel 103 so the panel 103 is sandwiched between the pair of latch pieces 152 and the plate portion 108. Furthermore, as shown in FIG. 20, in a state before the latch portion 105 is press-fitted and latched to the hole 103a of the panel 103, surfaces of the both ends 108b of the plate portion 108 facing the panel 103 are positioned closer to the panel 103 than a surface of the central portion 108a of the plate portion 108 facing the panel 103. Thus, when the latch portion 105 is press-fitted and latched to the hole 103a of the panel 103, the plate portion 108 is elastically deformed and the self-adhesive sheet 104 between the plate portion 108 and the panel 103 is compressed and contacts firmly with the outer periphery portion of the hole 103a.

To explain more, as shown in FIG. 22, once the latch portion 105 is press-fitted and latched to the hole 103a of the panel 103, the both ends 108b of the plate portion 108 are pushed against the panel 103 with the supporting points being the respective latch shoulders 153 of the pair of latch pieces 152 (in the drawing, an arrow F1 indicates a force applied to the both ends 108b), by which the central portion 108a of the plate portion 108 is pushed upward toward the panel 103 (in the drawing, an arrow F2 indicates a force generated at the central portion 108a). Thus, the self-adhesive sheet 104 located at the outer periphery portion of the panel 103 is pushed firmly against the panel 103, thereby maintaining good sealing performance for the hole 103a of the panel 103. Thus, water or dust can be prevented from entering inside of the vehicle from outside of the vehicle.

As described above, according to the present invention, the wire harness securing structure 1C having a superior sealing performance for the hole 103a of the panel 103 can be provided by using a simple and inexpensive wire harness clip 107B.

In the first, second and the third embodiments described above, the self-adhesive sheet is folded half to cover the plate portion and the wire harness. However, in the wire harness securing structure of the present invention, two or more self-adhesive sheets may be used, and these self-adhesive sheets may be adhered to each other so as to cover the plate portion and the wire harness. In this case also, the same effect can be obtained as in the case of covering by the self-adhesive sheet folded in half.

The above-described embodiments are only representative, and the present invention is not limited to these embodiments. The present invention can be modified in various ways and performed without departing from the frame of the present invention.

REFERENCE SIGNS LIST 1A, 1B, 1C wire harness securing structure
2, 102 wire harness
2a, 102a electric wire
3, 103 panel
3a, 103a hole
4, 104 adhesive sheet
4a, 104a through hole
5, 105 latch portion
6, 106, 108 plate portion
7, 107A, 107B wire harness clip
50, 150 support post
52, 152 latch piece

The invention claimed is:

1. A wire harness securing structure for securing a wire harness to a panel, comprising:
  a wire harness clip for securing the wire harness to the panel; and
  an adhesive sheet,
  wherein the wire harness clip includes a flat plate-like plate portion and a latch portion provided at the plate portion, the latch portion being arranged to be press-fitted and latched to a hole of the panel,
  wherein the plate portion and the wire harness are covered and secured by the adhesive sheet,
  wherein the adhesive sheet has elasticity so that, when applied with pressure the adhesive sheet shrinks in a thickness direction of the adhesive sheet and when the pressure is removed thickness of the adhesive sheet is restored,
  wherein the adhesive sheet is provided with a through hole through which the latch portion is passed, and
  when the latch portion is press-fitted and latched to the hole of the panel, the adhesive sheet between the plate portion and the panel is compressed and contacts firmly with an outer periphery portion of the hole.

2. The wire harness securing structure according to claim 1,
  wherein the latch portion is provided at a central portion of the plate portion,
  wherein an entire portion of the plate portion and the wire harness are covered and secured by the adhesive sheet, and
  in a state before the latch portion is press-fitted and latched to the hole of the panel, surfaces of both ends of the plate portion facing the panel are positioned closer to the panel than a surface of a central portion of the plate portion facing the panel, so that the plate portion is elastically deformed when the latch portion is press-fitted and latched to the hole of the panel.

3. The wire harness securing structure according to claim 1, wherein the latch portion includes a support post extending from the plate portion and a latch piece extending from a distal end of the support post toward the plate portion, the latch piece having a distal end arranged to engage with an edge of the hole of the panel.

4. The wire harness securing structure according to claim 2, wherein the latch portion includes a support post extending from the plate portion and a latch piece extending from a distal end of the support post toward the plate portion, the latch piece having a distal end arranged to engage with an edge of the hole of the panel.

5. The wire harness securing structure according to claim 3, wherein in a state before the latch portion is press-fitted and latched to the hole of the panel, a surface of the self-adhesive sheet facing the panel and the distal end of the latch piece are in contact with each other.

6. The wire harness securing structure according to claim 4, wherein in a state before the latch portion is press-fitted and latched to the hole of the panel, a surface of the self-adhesive sheet facing the panel and the distal end of the latch piece are in contact with each other.

7. The wire harness securing structure according to claim 1, wherein the through hole formed at the adhesive sheet has a dimension that is formed smaller than a dimension of the hole of the panel.

8. The wire harness securing structure according to claim 2, wherein the through hole formed at the adhesive sheet has a dimension that is formed smaller than a dimension of the hole of the panel.

9. The wire harness securing structure according to claim 1, wherein the adhesive sheet is a self-adhesive sheet.

10. The wire harness securing structure according to claim 2, wherein the adhesive sheet is a self-adhesive sheet.

11. The wire harness securing structure according to claim 2, wherein surfaces of the both ends of the plate portion facing the panel are formed into a projection and projecting toward the panel.

12. The wire harness securing structure according to claim 2, wherein the both ends of the plate portion are curved toward the panel.

* * * * *